(12) United States Patent
Nguyen (10) Patent No.: US 10,858,923 B2
(45) Date of Patent: Dec. 8, 2020

(54) ENHANCING COMPLEX FRACTURE NETWORKS IN SUBTERRANEAN FORMATIONS

(71) Applicant: Halliburton Energy Services, Inc., Houston, TX (US)

(72) Inventor: Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/472,765

(22) PCT Filed: Jan. 23, 2017

(86) PCT No.: PCT/US2017/014518
§ 371 (c)(1),
(2) Date: Jun. 21, 2019

(87) PCT Pub. No.: WO2018/136093
PCT Pub. Date: Jul. 26, 2018

(65) Prior Publication Data
US 2020/0256176 A1     Aug. 13, 2020

(51) Int. Cl.
*E21B 43/263*     (2006.01)
*C09K 8/80*     (2006.01)
(Continued)

(52) U.S. Cl.
CPC .............. *E21B 43/263* (2013.01); *C09K 8/70* (2013.01); *C09K 8/80* (2013.01); *E21B 33/138* (2013.01); *E21B 43/267* (2013.01)

(58) Field of Classification Search
CPC .... E21B 43/267; E21B 43/263; E21B 33/138; E21B 43/17; E21B 43/248; E21B 43/2405; E21B 43/26; C09K 8/665
See application file for complete search history.

(56) References Cited

U.S. PATENT DOCUMENTS

| | | | |
|---|---|---|---|
| 3,842,910 | A | 10/1974 | Zingg et al. |
| 4,448,926 | A | 5/1984 | Lundberg et al. |

(Continued)

FOREIGN PATENT DOCUMENTS

| | | |
|---|---|---|
| WO | 2010/039290 A1 | 4/2010 |
| WO | 2011/115723 A1 | 9/2011 |

(Continued)

OTHER PUBLICATIONS

International Search Report and Written Opinion issued in related PCT Application No. PCT/US2017/014547 dated Oct. 18, 2017, 19 pages.

(Continued)

*Primary Examiner* — Zakiya W Bates
(74) *Attorney, Agent, or Firm* — Thomas Rooney; Baker Botts L.L.P.

(57) ABSTRACT

The embodiments herein relate generally to subterranean formation operations and, more particularly, to enhancing complex fracture networks in subterranean formations by maximizing the exposed surface area to enable increased production rates. The embodiments of the present disclosure relate to increasing fracture network complexity and thus enhancing production within a subterranean formation using a plurality of fluid stages and a combination with liquid or solid electrically controlled propellants (ECPs), various electroconductive particulate sizes (EPs), and a source of electrical voltage.

20 Claims, 3 Drawing Sheets

(51) Int. Cl.
  *C09K 8/70* (2006.01)
  *E21B 43/267* (2006.01)
  *E21B 33/138* (2006.01)

(56) References Cited

U.S. PATENT DOCUMENTS

| | | | |
|---|---|---|---|
| 4,530,396 | A | 7/1985 | Mohaupt |
| 4,662,451 | A | 5/1987 | Boade |
| 4,780,221 | A | 10/1988 | Holtmyer et al. |
| 4,798,244 | A | 1/1989 | Trost |
| 5,295,545 | A | 3/1994 | Passamaneck |
| 5,346,015 | A | 9/1994 | Grundmann |
| 6,098,516 | A | 8/2000 | Gazonas |
| 6,169,134 | B1 | 1/2001 | Jones et al. |
| 6,321,655 | B1 * | 11/2001 | Tota ............... F42D 3/04 102/302 |
| 6,938,692 | B2 | 9/2005 | Nguyen et al. |
| 7,032,663 | B2 | 4/2006 | Nguyen |
| 7,040,405 | B2 | 5/2006 | Nguyen et al. |
| 7,044,224 | B2 | 5/2006 | Nguyen |
| 7,052,543 | B2 | 5/2006 | Nguyen et al. |
| 7,073,581 | B2 | 7/2006 | Nguyen et al. |
| 7,172,022 | B2 | 2/2007 | Reddy et al. |
| 7,216,708 | B1 | 5/2007 | Bond et al. |
| 7,331,385 | B2 | 2/2008 | Symington et al. |
| 7,431,075 | B2 | 10/2008 | Brooks et al. |
| 7,631,691 | B2 | 12/2009 | Symington et al. |
| 7,730,951 | B2 | 6/2010 | Surjaatmadja et al. |
| 7,794,537 | B2 | 9/2010 | Barlet-Gouedard et al. |
| 8,317,952 | B2 | 11/2012 | Katzakian et al. |
| 8,607,704 | B2 | 12/2013 | Stark et al. |
| 8,617,327 | B1 | 12/2013 | Katzakian et al. |
| 8,689,876 | B2 | 4/2014 | Loree et al. |
| 8,888,935 | B2 | 11/2014 | Grix et al. |
| 8,931,553 | B2 | 1/2015 | Cannan et al. |
| 9,027,641 | B2 | 5/2015 | Alekseenko et al. |
| 9,057,261 | B2 | 6/2015 | Walters et al. |
| 9,080,441 | B2 | 7/2015 | Meurer et al. |
| 9,182,207 | B2 | 11/2015 | McPherson et al. |
| 9,243,182 | B2 | 1/2016 | Lanctot-Downs et al. |
| 9,328,034 | B2 | 5/2016 | McPherson et al. |
| 2005/0205258 | A1 | 9/2005 | Reddy et al. |
| 2006/0011276 | A1 | 1/2006 | Grix et al. |
| 2006/0065400 | A1 | 3/2006 | Smith |
| 2006/0185898 | A1 | 8/2006 | Seekford |
| 2009/0305914 | A1 | 12/2009 | Li et al. |
| 2011/0067789 | A1 | 3/2011 | Grix et al. |
| 2012/0037368 | A1 | 2/2012 | Eick et al. |
| 2012/0328377 | A1 | 12/2012 | Brenneis et al. |
| 2013/0327529 | A1 | 12/2013 | Sprouse |
| 2013/0341029 | A1 | 12/2013 | Roberts et al. |
| 2014/0138090 | A1 | 5/2014 | Hill et al. |
| 2014/0144633 | A1 | 5/2014 | Nguyen et al. |
| 2014/0144635 | A1 | 5/2014 | Nguyen et al. |
| 2014/0251623 | A1 | 9/2014 | Lestz et al. |
| 2014/0318786 | A1 | 10/2014 | Vidma et al. |
| 2015/0021023 | A1 | 1/2015 | Roberts et al. |
| 2015/0060065 | A1 | 3/2015 | Scharmach et al. |
| 2016/0003022 | A1 | 1/2016 | Rothrock et al. |
| 2016/0153271 | A1 | 6/2016 | Mace et al. |
| 2016/0153274 | A1 | 6/2016 | Hull et al. |
| 2016/0186046 | A1 | 6/2016 | Barreto |
| 2016/0186501 | A1 | 6/2016 | Livescu et al. |
| 2016/0245061 | A1 | 8/2016 | Nguyen et al. |
| 2017/0016703 | A1 | 1/2017 | Mace et al. |

FOREIGN PATENT DOCUMENTS

| | | |
|---|---|---|
| WO | 2015/030908 A2 | 3/2015 |
| WO | 2015/126365 A1 | 8/2015 |
| WO | 2015/126408 A1 | 8/2015 |
| WO | 2016/036343 A1 | 3/2016 |
| WO | 2018/136095 A1 | 7/2018 |
| WO | 2018/136100 A1 | 7/2018 |

OTHER PUBLICATIONS

International Search Report and Written Opinion issued in related PCT Application No. PCT/US2017/014518 dated Oct. 23, 2017, 19 pages.

International Search Report and Written Opinion issued in related PCT Application No. PCT/US2017/014574 dated Oct. 24, 2017, 17 pages.

* cited by examiner

ENHANCING COMPLEX FRACTURE NETWORKS IN SUBTERRANEAN FORMATIONS

CROSS-REFERENCE TO RELATED APPLICATION

The present application is a U.S. National Stage Application of International Application No. PCT/US2017/014518 filed Jan. 23, 2017, which is incorporated herein by reference in its entirety for all purposes.

BACKGROUND

The embodiments herein relate generally to subterranean formation operations and, more particularly, to enhancing complex fracture networks in subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure necessary to create or enhance at least one fracture in a particular subterranean formation location, increasing pressure within a formation may be achieved by placing fluid therein at a high flow rate.

Typically, particulate solids are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant form a proppant pack having interstitial spaces that act as conductive paths through which fluids produced from the formation may flow. As used herein, the term "proppant pack" refers to a collection of proppant in a fracture, thereby forming a "propped fracture." The degree of success of a stimulation operation depends, at least in part, upon the ability of the proppant pack to permit the flow of fluids through the interconnected interstitial spaces between proppant while maintaining open the fracture.

The complexity of a fracture network (or "network complexity") may be enhanced by stimulation operations to create new or enhance existing (e.g., elongate or widen) fractures, which may be interconnected. As used herein, the term "fracture network" refers to the access conduits, either natural or man-made or otherwise, within a subterranean formation that are in fluid communication with a wellbore penetrating the formation. The "complexity" of a fracture network refers to the amount of access conduits, man-made or otherwise, within a subterranean formation that are in fluid communication with a wellbore; the greater the amount of access conduits, the greater the complexity. A fracture network with enhanced complexity may increase the amount of produced fluids that may be recovered from a particular subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to subterranean formation operations and, more particularly, to enhancing complex fracture networks in subterranean formations by maximizing the exposed surface area to enable increased production rates.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of"

or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

The embodiments of the present disclosure relate to increasing fracture network complexity and thus enhancing production within a subterranean formation using a plurality of fluid stages and a combination with liquid or solid electrically controlled propellants (ECPs), various electroconductive particulate sizes (EPs), which may or may not serve as effective proppant (e.g., may, but need not, have sufficient crush resistance, and the like, to hold open a fracture), and a source of electrical voltage. The EPs need not be capable of serving as effective proppant (although they may be formed of a material so capable) because the combustion of the ECPs itself can be used to disrupt formation rock and either the rubble of the rock or the offsetting of formation faces after combustion can be used to provide flow channels for produced fluids. That is, the formation fragments created from combustion of the ECPs in the formation may serve as proppant and/or the misalignment of fracture faces after combustion of the ECPs may themselves serve as flow channels.

As used herein, the terms "electrically controlled propellants" or "ECPs," and any grammatical variants thereof, refer to a liquid (including any flowing solution, including a gelled solution or solid combustible material, in which such combustion is initiated and extinguishable upon the application of electrical voltage. Unlike traditional propellants, such ECPs are not combustible by flame, spark, shock, or bullet impact, but instead are limited to combustion based solely on the application of electrical voltage. As such, these ECPs are inert unless an appropriate magnitude of electrical voltage is applied to them. Accordingly, such ECPs are combustible "on demand," and may be used repeatedly without loss or substantial loss of combustibility for a finite period of time. The ECPs are combustible at will over the finite period of time, and may result in degassing of benign, non-toxic gasses that are safe for use in close proximity to operators, such as carbon dioxide ($CO_2$), nitrogen ($N_2$), and water ($H_2O$).

Suitable ECPs for use in the methods and systems of the present disclosure include those disclosed by assignee Digital Solid State Propulsion, Inc. (or LLC) in U.S. Pat. Nos. 8,888,935; 8,317,952; 9,382,168; 9,328,034; 9,182,207; 8,617,327; U.S. Patent Publication No. 2006/0011276, each of which are incorporated herein by reference in their entirety.

For example, the ECPs may be in the form of a solid solution comprising an ionomer oxidizer polymer binder, an oxidizer mix having at least one oxidizer salt and at least one eutectic material, and a mobile phase comprising at least one non-volatile organic solvent, such as a non-volatile ionic liquid (e.g., N,n-butylpyridinium nitrate, dimethyl formamide, and the like, and any combination thereof). The ionomer oxidizer polymer binder may be polyalkylammonium binder, such as polyvinylammonium nitrate (PVAN), which may have a molecular weight in the range between 100,000 and 1,000,000. In some embodiments, the ionomeric polymer binder of the ECP solid solution is further crosslinked, such as by chemically reacting the polymer binder with epoxides (e.g., epoxy resins, such as glycidylmethacrylate, 1,3-butadiene diepoxy, glycerol diglycidyl ether, vinylcyclohexene diepoxy, 1,4-butanediol diglycidyl ether, and the like, and any combination thereof), diesters, salts of diacids, boric acid, and the like, and any combination thereof. The oxidizer salt may comprise ammonium nitrate and the eutectic additive may be a mixture of a variety of salts, which comprise an energetic material, such as ethanolamine nitrate, ethylene diamine dinitrate (EDDN), or other alkylamine or alkoxylamine nitrate, and the like, and any combination or admixture thereof. In some embodiments, mobile phase further comprises one or more alkylamine oxidizer salts, such as a relatively low molecular weight alkylamine, hydroxyethylamine or alkoxylamine nitrate, and the like, and any combination or admixture thereof. In one or all embodiments, the ECP solid solution composition may further include a compustion modifier additive, such as a 5-aminotetrazole complex of chromium (III), iron (III) and copper (II), any in combination with In another example, the ECPs are in the form of a solid solution comprising a binder, an oxidizer, and at least a boric acid crosslinking agent for crosslinking the binder (which may be used alone or in combination, for example, with an oxalic acid crosslinking agent). The binder may be polyvinylalcohol, a co-polymer of polyvinylalcohol/polyvinylamine nitrate, and any combination thereof. The oxidizer may be a hydroxylamine nitrate oxidizer, alone or in combination with one or more other amine nitrates, such as ethanolamine nitrate, ethylenediamine dinitrate, sodium nitrate, and any combination thereof. In some embodiments, the ECP solid solution comprising the binder, the oxidizer, and the crosslinking agent further comprises one or both of a stabilizer and/or a stability-enhancing additive to stabilize the oxidizer (e.g., the hydroxylamine nitrate oxidizer). The stabilizer may be ammonium dihydrogen phosphate, a dipyridyl complexing agent (e.g., 2,2'-dipyridyl), and any combination thereof; the stability-enhancing additive may be 5-aminotetrazole.

In some embodiments, the ECPs are in the form of an electrically ignitable gas-generating solid, liquid, or gel comprising at least one alkyl polymer binder, an oxidizer mixture including hydroxylamine nitrate oxidizer and a eutectic oxidizer mix (e.g., ammonium nitrate, hydrazine nitrate, ethanolamine nitrate, and the like, and any combination thereof), and a fuel source (e.g., a hydrocarbon liquid, monomer, or polymer, and any combination thereof). The alkyl polymer binder may be a nitrate based oxidizer, polyvinyl alcohol, polyvinylamine nitrate, polyvinyl alcohol co-polymer polyvinylamine nitrate, and polyethylenimine nitrate, polyethanolaminobutyne nitrate, and any combination thereof. In some embodiments, the gas-generating ECPs may further comprise an additive to prevent crystallization of the hydroxylamine nitrate oxidizer, such as ammonium nitrate, hydrazine nitrate, alkyl amine nitrate (e.g., ethanolamine nitrate, ethylamine nitrate, methylamine nitrate, and the like, and any combination thereof), other nitrate salts, water, alcohol, and the like, and any combination thereof. In one or all embodiments, the gas-generating ECPs may further include a mass enhancing non-fuel metal, a metalized fuel component, a nano-particle, a combustion modifier, and any combination thereof. The mass enhancing non-fuel metal may be gold, platinum, tungsten, zirconium, and any combination thereof; the metalized fuel component may be aluminum, boron, tungsten, zirconium, a glass phase metal (e.g., glassy boron, tungsten, molybdenum, zirconium, and the like), and the like, and any combination thereof; the nano-particle may be composed of boron, magnesium, aluminum coated tungsten, aluminum coated zirconium, and the like, and any combination thereof; and the combustion modifier may be an energetic nitrate polymer (e.g., polyethanolaminobutyne nitrate), a 5-aminotetrazole complex metal (e.g., with nickel(II), chromium(III), iron(III), and any combination thereof), and the like, and any combination thereof.

In other examples, the ECPs may be in the form of a liquid comprising an oxidizer, a soluble fuel additive, and additional additives, such as those described herein, to enhance various properties of the ECPs. The oxidizer of the liquid ECPs may be hydroxylammonium nitrate and/or hydroxylamine nitrate and the fuel additive may include CHO compounds (e.g., cyclodextrins, complex saccharides such as xylitol, polyhydroxyl compounds such as hydroxyethyl and hydroxypropyl cellulose, and the like, and any combination thereof) that are soluble in the oxidizer. The liquid ECPs may further includes one, more, or all of a stabilizer for the hydroxylammonium nitrate (e.g., 2,2'-bipyridyl which may also act as a sequestering agent, and/or any described herein or in the incorporated by reference patents and patent applications), a buffer (e.g., comprising ammonium dihydrogen phosphate, ammonium or organic amine dihydrogen phosphates such as $NH_4H_2PO_4$, diammonium or di-organic amine monohydrogen phosphates such as $(NH_4)_2HPO_4$, and the like, and any combination thereof) for thermal stability, a surfactant (e.g., n-octanol), a sequestering agent (e.g., 2,2'-bipyridyl) for removing transition metal contaminants, a co-oxidizer (e.g., ammonium nitrate, organo-substituted amine nitrates such as methyl ammonium nitrate, any homologs thereof, and the like, and any combination thereof) for stabilizing the oxidizer and depress the freezing point, a combustion enhancer (e.g., a polynitrogen compound, such as 1,2,4-triazole, 5-aminotetrazole, substituted triazoles, tetrazoles, and the like, and any combination thereof) to increase stability and onset temperatures. In one or all embodiments, the liquid ECPs may additionally further include one, more, or all (alone or in addition to any other additives described herein) a co-oxidizer (e.g., hydroxyethylammonium formate) to stabilize the composition and depress freezing point, a soluble salt (e.g., monomethylammonium nitrate) to depress freezing points, and/or a nanoengineered particulate fuel additive (e.g., composed of aluminum, boron, silicon, titanium, and the like, and any combination thereof) to optimize ignition properties.

In some embodiments, any of the above-described ECPs may be fine-tuned by altering an amount of crosslinking agent, such as boric acid, for example to affect the mechanical properties and temperature ranges for operation of the ECPs. In some embodiments, any of the above-described ECPs may further comprise an organosilane, a siloxane, a poly(dimethylsiloxane), and the like, and any combination thereof to enhance crosslinking, affect adhesion promotion, reduce moisture uptake, reduce hygroscopic characteristics, enhance coupling of fuel and polymer binders, and the like. In still other embodiments, any of the above-described ECPs may further include polyhydroxyl compounds (e.g., cellulose compounds) to affect viscosity of certain components, decrease settling, increase polymer binder functionality, and the like. Any of the above-described ECPs may further include a cyclic saccharide (e.g., cyclodextrin) to increase the ECPs ability to sequester and/or retain certain transitional metal contaminants that may otherwise destabilize the ECPs, as well as increase ballistic, mechanical, conductive, and ignition properties. Further, any of the above-described ECPs may include multifunctional amines (e.g., trishydroxyethylisocyanurate, ethylenediaminetetraacetic acid, and the like, and any combination thereof) to improve stability, shift onset temperature ranges upward, an sequester certain catalytic decomposers (e.g., transition metals); and/or phosphates (e.g., multifunctional phosphates, organophosphates, polyphosphates, phosphonates, and the like, and any combination thereof) to protect any oxide layers, enhance long-term storage, maximize any protective metal oxide shell, and the like; and/or polynitrogen compounds (e.g., 1,2,4-triazole, 1,3,5-triazine, and the like, and any combination thereof) to increase stability and onset temperature, modify ballistics, improved mechanical properties, and the like; and/or nanoengineered particulate fuel additives (e.g., composed of aluminum, boron, silicon, titanium, and the like, and any combination thereof) to optimize ignition properties. In still other embodiments, any of the above-described ECPs may be used with polymeric (e.g., polyvinyl alcohol) embedment granules/liners to aid in bonding the ECPs to various substrates, such as a subterranean formation face (e.g., a wellbore and/or fracture face).

As used herein, the term "electroconductive [micro- or macro-] particulates," encompassing any grammatical variants and acronyms thereof (e.g., "EPs," "EMicroPs," "EMacroPs"), refers to a solid particulate material that is at least partially coated with an electroconductive resin, the electroconductive resin comprising a resin and an electrically conductive material. The acronym "EP," as used herein, encompasses both electroconductive micro-particulates (EMicroPs) and electroconductive macro-particulates (EMacroPs), unless otherwise indicated. As used herein, the term "source of electrical voltage," and grammatical variants thereof, refers to any source capable of supplying or transmitting an electric potential difference between at least two points (a voltage) by any mechanism. For instance, a source of electrical voltage may include, but is not limited to, generating an electric field, generating electric current through a magnetic field, generating a time-varying magnetic field, and the like, and any combination thereof. In some embodiments, the source of electrical voltage may be a battery, a generator, or other power system that includes a lead for placement at a downhole location in a subterranean formation which supplies electrical voltage to one or both of the ECPs and/or the EPs to control combustion of the EPPs at the downhole location.

The synergistic combination of hydraulic fracturing and both the ECPs and the EPs for use in the methods and systems of the present disclosure advantageously permits substantial reduction in water or fracturing use and fracturing (frac) sand for performing traditional hydraulic fracturing operations, thereby conserving resources and decreasing costs, and further enhances fracture complexity compared to hydraulic fracturing alone or propellant fracturing alone. Further, the ECPs and EPs are both susceptible to electrical voltage and, thus, an electrical voltage may be applied directly to the ECPs or indirectly through transmission of an electrical voltage applied to one or more of the EPs described herein. This allows a single electrical voltage source or lead (although more may be used) to be applied at any location within a complex fracture network (e.g., only in the near-wellbore region) to be propagated throughout the entire complex fracture network, combusting the ECPs and thus creating or enhancing additional fracture complexity. The combustibility of the ECPs further greatly enhances contact surface area in a subterranean formation, particularly unconventional (or tight) formations, such as by placement of the ECPs in the bedding planes of a shale, tight sandstone, or coal-bed methane formation, and does so without the heightened hazards associated with traditional explosives or non-electrically controlled propellants. As used herein, the term "bedding plane," and grammatical variants thereof, refers to the surface that separates successive layers of stratified formation rock from its preceding layer, where such layers are often found in unconventional (or tight) formations. Indeed, because the ECPs for use in the embodiments described herein can be ignited and extinguished on demand (including multiple times over a period of time), their combustion can be controlled to ensure that any hazardous conditions are avoided or otherwise mitigated.

In some embodiments, the methods and systems described herein involve a series of fluid stages to create or enhance (e.g., extend in length and/or width) at least one dominate fracture, followed by creation or enhancement of one or more branch fractures. As used herein, the term "dominate fracture," and grammatical variants thereof, refers to a primary fracture extending from a wellbore. As used herein, and with the embodiments of the present disclosure, the wellbore may be vertical, horizontal, or deviated (neither vertical, nor horizontal), without departing from the scope of the present disclosure. In some embodiments, the dominate fracture(s) described herein may have a length of greater than about 3 meters ("m"). As a specific example, in some instances, the dominate fracture(s) may have a length in the range of about 3 m to about 300 m, encompassing any value and subset therebetween. A "branch fracture," and grammatical variants thereof, as used herein, refers to a non-primary fracture extending from a dominate fracture or extending from any other non-primary fracture (e.g., a secondary branch fracture, a tertiary branch fracture, and the like). Accordingly, a branch fracture may itself extend from another branch fracture, and is encompassed in the term "branch fracture." As used herein, a secondary branch fracture is a branch fracture extending from a dominate fracture; a tertiary branch fracture is a branch fracture that extends from a secondary branch fracture; and so forth. A branch fracture may be formed by combustion of the ECPs described herein, and also by hydraulic mechanisms or shear mechanisms (e.g., sliding of bedding planes, shifting of formation portions, stress relief, and the like). In some embodiments, the branch fracture(s) described herein may have a length of less than about 50 meters ("m"). As a specific example, in some instances, the branch fracture(s) have a length in the range of about 0.03 m to about 50 m, encompassing any value and subset therebetween.

The dominate fractures and branch fractures described herein may be of any shape and may be formed by an ablation of any form (e.g., by the ECPs and hydraulic fracturing) that allows fluids to flow from the subterranean formation and into a wellbore, consistent with the descriptions provided herein. Typically branch fractures extend orthogonally from the originating dominate or non-dominate fracture, and may be in the form of cracks, slots, conduits, perforations, holes, or any other ablation within the formation. Branch fractures, regardless of the type of fracture from which they originate, typically have a flow channel width or flow opening size of less than that of the dominate fracture or non-dominate fracture from which it extends. In some instances, the branch fracture can be considered a microfracture due to its flow channel width or flow opening size. Branch fractures that are considered microfractures may have a flow channel width or flow opening size of from about 1 μm to about 100 μm, encompassing any value and subset therebetween. As used herein, the term "fracture" refers collectively to dominate fractures and microfractures, unless otherwise specified.

The length and flow channel width of the dominate and branch fracture(s) described herein depend on a number of factors including, but not limited to, the type of subterranean formation being stimulated, the pressure (e.g., pump pressure) at which the treatment fluids are introduced, the type and content of the particular treatment fluids (e.g., the concentration and size and longevity of the ECPs and EPs), and the like, and any combination thereof.

In some embodiments, the dominate and branch fracture(s) described herein are formed using a plurality of treatment fluid stages that rely not only on the presence or absence of certain particulates or additives (e.g., ECPs and/or EPs), but also on viscosity. In some instances, high-viscosity treatment fluids may be used in the embodiments herein to create or enhance dominate fractures, for example, in the maximum stress direction of a formation, even if pre-existing fractures crossing the maximum stress direction exist. Such high-viscosity treatment fluids may generate thick and planar dominate fractures with few branch fractures extending therefrom. As used herein, a "high-viscosity treatment fluid" or simply "high-viscosity fluid," and grammatical variants thereof, refer to a fluid having a viscosity in the range of greater than about 100 centipoise (cP) to about 20000 cP, encompassing any value and subset therebetween. In some instances, a low-viscosity treatment fluid (e.g., slickwater, linear gel, and the like) may be used in the embodiments herein to create or enhance branch fractures. As used herein, a "low-viscosity fluid" or simply "low-viscosity treatment fluid," and grammatical variants thereof, refers to a fluid having a viscosity in the range of about 0.1 cP to about 100 cP, encompassing any value and subset therebetween. Each of these values depends on a number of factors including, but not limited to, the type of subterranean formation, the desired dimensions of the dominate and branch fracture(s), the remaining components of the treatment fluid, and the like.

As used herein, the term "slickwater fluid," and grammatical variants thereof, refers to a low-viscosity linear fluid further comprising a friction reducing agent, such as polyacrylamide, to enable increased the flow of the fluid in the wellbore. The term "linear gel," and grammatical variants thereof as used herein, refers to a non-crosslinked, low-viscosity fluid comprising a gelling agent that may be guar-based, cellulose-based, or other polymer-based systems that hydrate to create viscosity in a base fluid.

The embodiments described herein may utilize a treatment fluid comprising various particulates (e.g., solid EPCs, EPs, and/or solid additives) or may be a solids-free treatment fluid, depending on the particular desired action. For example, a solids-free treatment fluid may be preferred for forming the dominate fracture of the present disclosure. As used herein, the term "solids-free" with reference to a treatment fluid (either a high-viscosity fluid or a low-viscosity fluid) means that no solid particulates are intentionally introduced into the fluid; it does not preclude solid particulates from entering into the fluid as it traverses through oil and gas equipment or the formation (e.g., formation fines, and the like). Generally, a solids-free treatment fluid has no more than about 5% solids by weight before it is introduced into a subterranean formation.

The embodiments described herein are further designed to enhance fracture complexity in the far-field region, in the near-wellbore region, or both in the far-field and near-wellbore regions of a subterranean formation, including unconventional formations by synergistically employing both hydraulic fracturing and ECP combustion. As used herein, the term "near-wellbore region," and grammatical variants thereof, refers to an annular volume of a subterranean formation penetrated by wellbore from the outer diameter of the wellbore extending radially inward along a dominate fracture from the wellbore and into the formation a distance of no greater than about 10 meters (33 feet). As used herein, the term "far-field wellbore region," and grammatical variants thereof, refers to an annular volume of a subterranean formation penetrated by wellbore from the outer diameter of the wellbore extending radially inward along a dominate fracture beyond the near-wellbore region, or along a branch fracture. In some instances, the far-field region may be beyond the dominate fracture tip into the subterranean formation, the dominate fracture tip the portion of the dominate fracture that permits growth of the dominate fracture.

As described above, unconventional subterranean formations include tight formations having low or ultra-low permeability, such as shale formations, tight-gas formations (e.g., tight-gas sandstone formations), coal-methane formations, and the like. As used herein, the term "subterranean formation" or simply "formation," and grammatical variants thereof, refer to any type of subterranean formation, including tight formations, unless otherwise specified. The permeability of a formation is a measure of the formation's resistance to through-flow fluid. Thus, low-permeability formations require considerable applied pressure in order to flow fluid through its pore spaces, as compared to formations having higher permeabilities. As used herein, the terms "low-permeability subterranean formation" or simply "low-permeability formation," and grammatical variants thereof, refer to a tight formation that has a matrix permeability of less than 1,000 microdarcy (equivalent to 1 millidarcy). As used herein, the term "low-permeability subterranean formation" encompasses "ultra-low permeability subterranean formations," and grammatical variants thereof, which refers to a formation that has a matrix permeability of less than 1 microdarcy (equivalent to 0.001 millidarcy).

Multistage fracturing may also be utilized with the embodiments of the present disclosure to further enhance fracture complexity, and thus the amount of hydrocarbons produced therefrom. As used herein, the term "multistage fracturing treatments," and grammatical variants thereof, refers to a subterranean formation operation in which a plurality of reservoir intervals, or a plurality of locations within one or more reservoir intervals, in the subterranean formation are stimulated in succession, including dominate and branch fractures. Examples of multistage fracturing treatments may include, but are not limited to, plug-and-perf operations, dissolvable plug-and-perf operations, continuous stimulation operations, and the like, and any combination thereof. For example, in some multistage fracturing treatments, a first fracture may be formed at a reservoir interval (e.g., through an opening), followed by at least a second fracture formed at the same or a different reservoir (e.g., through the same or different opening) interval in a subterranean formation. In some instances, multistage fracturing may involve fracturing a section of a reservoir interval, followed by plugging the fracture such that a treatment fluid may be diverted to a different location in the same reservoir interval or a different reservoir interval for forming a second fracture. The second fracture may then be plugged and the process repeated until the desired number of fractures are formed.

Accordingly, the embodiments of the present disclosure further permit creation of multiple dominate fractures within a single set of openings, which can further have branch fractures that may or may not interconnect in the near-wellbore or far-field regions to further enhance fracture network complexity. The term "opening" refers to any orifice or gap extending into a subterranean formation from a wellbore and may include, but is not limited to, a natural opening, an opening caused by a perforation charge of any size or shape, an opening caused by a group of perforation charges, an opening caused by a jetting fluid and/or particulate penetration from a jetting tool, an opening caused by a jetting fluid and/or particulate penetration from a ball drop sliding or mechanically shifting sleeve port, an opening caused by a jetting fluid and/or particulate penetration from a restricted ball drop sliding or mechanically shifting sleeve port, and the like, and any combination thereof. An "opening" encompasses a single opening and any cluster of openings (e.g., any single perforation and/or slot, and any clusters of perforations and/or slots), unless otherwise specified, and may be made in a wellbore itself, or through casing or liner, which may or may not be cemented.

The various treatment fluids described herein may be accordingly introduced through one or more openings at one or more treatment intervals for creating or enhancing fracture complexity. As used herein, the term "treatment interval," and grammatical variants thereof, refers to a length of a wellbore, which may be any length including the entire length of the wellbore or a portion thereof comprising one or more opening(s). The opening may thus be a single opening or a cluster of openings within the treatment interval, without departing from the scope of the present disclosure.

As mentioned above, increasing fracture complexity in subterranean formations may increase the conductivity and productivity of the formation. Increasing fracture network complexity (e.g., keeping fractures, such as dominate fractures and branch fractures as described below, opened) greatly increases the surface area for the hydrocarbons (gas and/or oil) to desorb from the formation matrix, providing flow paths for these fluids to communicate with connected fractures and the wellbore for recovery.

In some embodiments, the present disclosure provides a method of creating fracture complexity in the far-field wellbore region of a subterranean formation. In particular, a first treatment fluid may be introduced through one or more openings and into a subterranean formation at a first treatment interval above the fracture gradient of the formation to create or enhance at least one dominate fracture therein. In some embodiment, the first treatment fluid used to create or enhance the at least one dominate fracture is solids-free and high-viscosity, as defined above, and comprises at least a base fluid. In other embodiments, the first treatment fluid is solids-free, and further includes liquid ECPs (including gelled liquid), which may be used to enhance the viscosity of the first treatment fluid for use during creation or enhancement of the dominate fracture, as well as provide for enhanced fracture complexity upon application of electrical voltage, as described below.

Thereafter, a second treatment fluid is introduced into the subterranean formation (e.g., through the same or different opening(s)) at the first treatment interval above the fracture gradient to create or enhance at least one branch fracture therein. The second treatment fluid used to create or enhance the at least one branch fracture is low-viscosity, as defined above, and comprises at least a base fluid (which may be the same or different than that of the base fluid in the first treatment fluid), first ECPs, and EMicroPs (i.e., the EPs define above, having a particular micro-size as described below). At least a portion of the first ECPs and the EMicroPs are placed into the at least one branch fracture.

Thereafter, a third treatment fluid is introduced into the subterranean formation at the first treatment interval above the fracture gradient. The third treatment fluid may be either high-viscosity or low-viscosity and comprises at least a base fluid (which may be the same or different than that of the base fluid in the first and/or second treatment fluid), second ECPs, and first EMacroPs (i.e., the EPs define above, having a particular macro-size as described below). At least a portion of the second ECPs and the first EMacroPs into the far-field wellbore region of the at least one dominate fracture.

An electrical voltage is then applied to one, more than one or all of the first ECPs, the second ECPs, the EMicroPs, and/or the first EMacroPs. Electrical voltage is thus applied directly to one or both of the first and/or second ECPs to detonate the first and/or second ECPs, or is transmitted via the EMicroPs and/or the first EMacroPs to the first and/or second ECPs to detonate the first and/or second ECPs. The detonation of the first and/or second ECPs can be initiated by the application of the electrical voltage and extinguished by cessation of the electrical voltage. Such detonation, whether prolonged or in a pulsed manner, enhances the complex fracture network within the formation at the first treatment interval having the at least one dominate fracture and the at least one branch fracture. For example, the detonation of the first and/or second ECPs induces generation of numerous additional branch fractures extending from the dominate fracture or other branch fractures, thereby enhancing fracture network complexity and the interconnectivity of contact surface areas for the production of hydrocarbons to flow therethrough.

Accordingly, the application of the electrical voltage is thus repeated at least once, where the electrical voltage is applied and ceased, and then re-applied at least once in the same treatment interval (e.g., the first treatment interval). That is, the electrical voltage may be used to initiate and extinguish the first and/or second ECPs within the far-field wellbore region to have a pulsing effect that gradually disrupts the formation rock at each pulse to enhance the complexity of the fracture network comprising the at least one dominate fracture and the at least one branch fracture. In still other embodiments, the process of introducing the first treatment fluid, the second treatment fluid, and the third treatment fluid for forming the at least one dominate fracture and the at least one branch fracture, placing the first ECPs, the second ECPs, the EMicroPs, and the first EMacroPs into their respective fractures, and applying the electrical voltage to one or more of those particulates is repeated at least once at at least a second interval (i.e., more than two intervals may be treated per the methods described herein). Thus, as mentioned above, the application of the electrical voltage may be repeated at least once where the electrical voltage is applied and ceased, and then re-applied at least once in the at least second treatment interval.

In some embodiments, the present disclosure provides a method of creating fracture complexity in both the far-field wellbore region and the near-wellbore region of a subterranean formation. In such embodiments, the method described above with reference to the far-field wellbore region is performed of introducing the first treatment fluid, the second treatment fluid, and the third treatment fluid for forming the at least one dominate fracture and the at least one branch fracture, and placing the first ECPs, the second ECPs, the EMicroPs, the first EMacroPs into their respective fractures. However, prior to applying the electrical voltage, a fourth treatment fluid is introduced into the subterranean formation above the fracture gradient at the first treatment interval. The fourth treatment fluid may be either high-viscosity or low-viscosity and comprises at least a base fluid (which may be the same or different than that of the base fluid in the first, second, and/or third treatment fluid) and second EMacroPs (i.e., the EPs define above, having the particular macro-size as described below). At least a portion of the second EMacroPs are placed into the near-wellbore region of the at least one dominate fracture.

After the placement of the second MacroPs in the near-wellbore region, an electrical voltage is then applied to one, more than one or all of the first ECPs, the second ECPs, the EMicroPs, the first EMacroPs (from the third treatment fluid), and/or the second EMacroPs. Electrical voltage is thus applied directly to one or both of the first and/or second ECPs to detonate the first and/or second ECPs, or is transmitted via the EMicroPs, the first EMacroPs, and/or the second EMacroPs to the first and/or second ECPs to detonate the first and/or second ECPs. The detonation of the first and/or second ECPs can be initiated by the application of the electrical voltage and extinguished by cessation of the electrical voltage. Such detonation, whether prolonged or in a pulsed manner, enhances the complex fracture network within the formation at the first treatment interval having the at least one dominate fracture and the at least one branch fracture.

Accordingly, the application of the electrical voltage is thus repeated at least once, where the electrical voltage is applied and ceased, and then re-applied at least once in the same treatment interval (e.g., the first treatment interval). That is, the electrical voltage may be used to initiate and extinguish the first and/or second ECPs within the far-field wellbore region or the near-wellbore region, or, more likely, simultaneously both the far-field wellbore and the near-wellbore regions, to have a pulsing effect (i.e., generating pressure waves) that gradually disrupts the formation rock at each pulse to enhance the complexity of the fracture network comprising the at least one dominate fracture and the at least one branch fracture. In still other embodiments, the process of introducing the first treatment fluid, the second treatment fluid, the third treatment fluid, and the fourth treatment fluid for forming the at least one dominate fracture and the at least one branch fracture, placing the first ECPs, the second ECPs, the EMicroPs, the first EMacroPs, and the second EMacroPs into their respective fractures, and applying the electrical voltage to one or more of those particulates is repeated at least once at at least a second interval (i.e., more than two intervals may be treated per the methods described herein). Thus, as mentioned above, the application of the electrical voltage may be repeated at least once where the electrical voltage is applied and ceased, and then re-applied at least once in the at least second treatment interval.

In some embodiments, after application of the one or more prolonged or pulses of electrical voltage, a stabilizing treatment fluid may be introduced into the subterranean formation below the fracture gradient at the first (or at least second) treatment intervals in either of the far-field wellbore region application, or the combined far-field wellbore and near-wellbore region application, each described above. The stabilizing treatment fluid may be a low-viscosity, as defined above, and comprise at least a base fluid (which may be the same or different than that of the base fluid in the first, second, third, and/or fourth treatment fluid) and a curable formation stabilizing agent. Suitable curable formation stabilizing agents may include, but are not limited to, non-aqueous tackifying agents, aqueous tackifying agents, emulsified tackifying agents, silyl-modified polyamide compounds, curable resins, crosslinkable aqueous polymer compositions, polymerizable organic monomer compositions, consolidating agent emulsions, zeta-potential modifying aggregating compositions, silicon-based resins, binders, and any combination thereof. Typically, the curable formation stabilizing agents may be present in the stabilizing treatment fluid in an amount of from about 0.01% to about 10% by volume of the base fluid of the stabilizing treatment fluid, encompassing any value and subset therebetween.

In some embodiments, the process of introducing the first treatment fluid, the second treatment fluid, and the third treatment fluid for forming the at least one dominate fracture and the at least one branch fracture, placing the first ECPs, the second ECPs, the EMicroPs, and the first EMacroPs into their respective fractures, applying the electrical voltage to one or more of those particulates, and introducing the stabilizing treatment fluid is repeated at least once at at least a second interval (i.e., more than two intervals may be treated per the methods described herein). In other embodiments, the process of introducing the first treatment fluid, the second treatment fluid, the third treatment fluid, and the fourth treatment fluid for forming the at least one dominate fracture and the at least one branch fracture, placing the first ECPs, the second ECPs, the EMicroPs, the first EMacroPs, and the second EMacroPs into their respective fractures, applying the electrical voltage to one or more of those particulates, and introducing the stabilizing treatment fluid is repeated at least once at at least a second interval (i.e., more than two intervals may be treated per the methods described herein).

The electrical voltage may be applied to one or more ECP or EP particulates described herein by any means suitable for use in allowing the ECPs to be directly detonated on demand, or allowing EPs to conduct the electrical voltage and detonate the ECPs on demand, as described herein. For example, in some embodiments, the electrical voltage is applied using an electrode extending into the subterranean formation from a source of electrical potential at a surface location and in current path contact with at least one or more of EPs and/or ECPs. As used herein, the term "current path contact," and grammatical variants thereof, refers to any path between at least two objects capable of transmitting an electrical potential, regardless of whether physical contact is created between the at least two objects. Typically, the magnitude of electrical voltage required to detonate any of the ECPs described herein is greater than or equal to about 100 volts (V). In preferred embodiments, the magnitude of electrical voltage required to detonate any of the ECPs described herein is greater than or equal to about 100 V to about 600 V, encompassing any value and subset therebetween.

In some embodiments, the electrical voltage is applied by one or more sources of electrical potential at a surface location, where an electrically conductive electrode terminal extends from the source and into the subterranean formation. The terminal of the electrode(s) may physically contact one or more sections of the wellbore, thereby permitting electrical voltage application to one or more of the EPs and ECPs placed therein. In some instances, the conductivity of the various EPs are selected such that the applied electrical voltage results in a continuous increase in heat within a fracture from the near-wellbore region to the far-field wellbore region (i.e., the heat increases further from the wellbore) by electrical resistivity. Such electrical voltage transmission can be used to create current path contact between the electrode terminal and the EPs and/or ECPs as described herein sufficient to detonate the ECPs. This is both a practical and viable means to transmit the applied electrical voltage, in accordance with the embodiments described herein. The source of electrical potential may be electrically obtained directly from a regional grid. In other embodiments, the source of electrical potential may be obtained or otherwise generated at the wellsite (e.g., at a surface location near the wellsite) through a gas turbine, a combined cycle power plant, an insulated electrical cable, a battery, a generator, any other source of electrical voltage, any in combination with a regional grid, and any combination thereof.

Referring now to the ECPs described herein, the first and/or second ECPs included in the treatment fluids described in any of the embodiments of the present disclosure may be in a solid state, a liquid state, or a combination of both a solids state and a liquid state (i.e., at least two different states of ECPs in combination). The ECPs may be placed in the dominate fracture and/or the branch fractures described herein, including placement specifically in bedding places of unconventional formations, which are generally oriented perpendicular to the dominate fracture. In some specific embodiments, the first ECPs included in the second treatment fluid are in a liquid state and the second ECPs included in the third treatment fluid are in a solid state, thereby ensuring that the liquid ECPs are able to deeply penetrate the far-field wellbore region without being hindered by their size or shape. Similarly, as mentioned above, the first treatment fluid may further comprise liquid ECPs for use in creating or enhancing the dominate fracture described herein (as well as aiding in forming subsequent at least one branch fracture(s)). In the embodiments described herein, accordingly, and unlike conventional approaches, the ECPs are generally placed at a location in a dominate or branch fracture that permits the formation of fracture complexity without wellbore formation damage in the near-wellbore region due to the detonation of such ECPs.

When in the liquid state, the ECPs are generally included in any of the treatment fluids described herein in an amount in the range of about 0.01% to about 98% by volume of the base fluid of the treatment fluid, encompassing any value and subset therebetween. When in solid form, the ECPs may be of any size or shape suitable for placement in a particular fracture type or for use in forming fracture complexity of a particular type. For example, the solid state ECPs for placement in a branch fracture may be preferably smaller in unit mesh size than solid state ECPs for placement in a dominate fracture. As used herein, the term "unit mesh size," and grammatical variants thereof, refers to a size of an object (e.g., a particulate) that is able to pass through a square area having each side thereof equal to a specified numerical value. Generally, the unit mesh size of the solid state ECPs described herein is in the range of from about 0.1 micrometers ($\mu m$) to about 4000 $\mu m$, encompassing any value and subset therebetween, depending on the size and shape of the fracture in which they are to be included. If the solid state ECPs are for placement in a dominate fracture, they may be selected at the larger end of this range, such as in the range of from greater than about 100 micrometers ($\mu m$) to about 4000 $\mu m$, encompassing any value and subset therebetween.

The EPs (micro- and macro-) described herein are composed of solid particulate material that is at least partially coated with an electroconductive resin. The term does not imply 100% coating, and in some instances, greater than about 25% to 100% of the surface of the solid particulate material is coated with the electroconductive resin. In one specific embodiment, the coating amount (and thickness) is selected to achieve a conductivity of at least about 1 milliampere (mA). In specific embodiments, the coating amount (and thickness) is selected to achieve a conductivity of at least about 1 mA to about 100 mA, encompassing any value and subset therebetween. In another specific embodiment, the electroconductive resin is coated onto the surface of the solid particulate material in an amount in the range of from about 0.1% to about 6% by weight of the solid particulate material, encompassing any value and subset therebetween.

The solid material used in forming the EPs of the present disclosure may be any solid material, which itself may or may not be capable of withstanding fracture closure pressures (i.e., acting as proppant), as described above. Generally, the EPs of any size and shape for use in the embodiments described herein, and further described below, may be included in any treatment fluid in the range of from about 2% to about 95% by volume of the base fluid of the treatment fluid in which they are included, encompassing any value and subset therebetween. Accordingly, this may be only EMicroPs, only EMacroPs, or a combination of both where appropriate, without department fluid the scope of the present disclosure.

The electroconductive resin for forming the EPs of the present disclosure may be a curable resin mixed with a conductive material. Examples of suitable curable resins may include, but are not limited to, two component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and any combination thereof. Suitable conductive materials may include, but are not limited to, powders that comprise conductive particulates, such as graphite, copper, iron, zinc, brass, tin, conductive plastics, conductive graphite materials, and any combination thereof. In one specific embodiment, the electroconductive resin may comprise an epoxy resin containing fine graphite powder. In another specific embodiment, the electroconductive resin may comprise a furan resin containing fine particulate copper.

Generally, the EPs described herein have a unit mesh size in the range of from about 0.1 μm to about 4000 μm, encompassing any value and subset therebetween, depending on the size and shape of the fracture in which they are to be included. For example, the EMicroPs may have a unit mesh size in the range of from about 0.1 μm to 100 μm, encompassing any value and subset therebetween; and the EMacroPs may have a unit mesh size in the range of from greater than 100 μm to about 4000 μm, encompassing any value and subset therebetween. In some embodiments, the conductive material itself has a unit mesh size in the range of from about 0.01 μm to about 100 μm, encompassing any value and subset therebetween, thereby including both powders and larger sized conductive material.

The shape of the solid state ECPs and EPs described herein may be of any shape capable of meeting the desired unit mesh size or unit mesh size range, as described above. For example, the solid ECPs and/or EPs may be substantially spherical, fibrous, or polygonal in shape. As used herein, the term "substantially spherical," and grammatical variants thereof, refers to a material that has a morphology that includes spherical geometry and elliptic geometry, including oblong spheres, ovoids, ellipsoids, capsules, and the like and may have surface irregularities. As used herein, the term "fibrous," and grammatical variants thereof, refers to fiber-shaped substances having aspect ratios of greater than about 5 to an unlimited upper limit. The term "polygonal," and grammatical variants thereof, as used herein, refers to shapes having at least two straight sides and angles. Examples of polygonal solid ECPs and/or EPS may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof.

The base fluids for use in any of the treatment fluids of the present disclosure (e.g., the first, second, third, fourth, and/or stabilizing treatment fluid) may be of any type suitable for use in increasing fracture complexity according to one or all of the embodiments described herein. The particular selected base fluid for any particular treatment fluid may be wholly the same, wholly different, or otherwise overlapping in type in any manner. For example, the base fluid in the first treatment fluid may be the same or different from one, more than one, or all of the other treatment fluids used in a particular process, without departing from the scope of the present disclosure. Suitable base fluids may include, but are not limited to, oil base fluids, aqueous base fluids, aqueous-miscible base fluids, water-in-oil emulsions, or oil-in-water emulsions.

One or all of the treatment fluids described herein may further comprise a wellbore additive, without departing from the scope of the present disclosure. Such additives may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

Figure 1A:
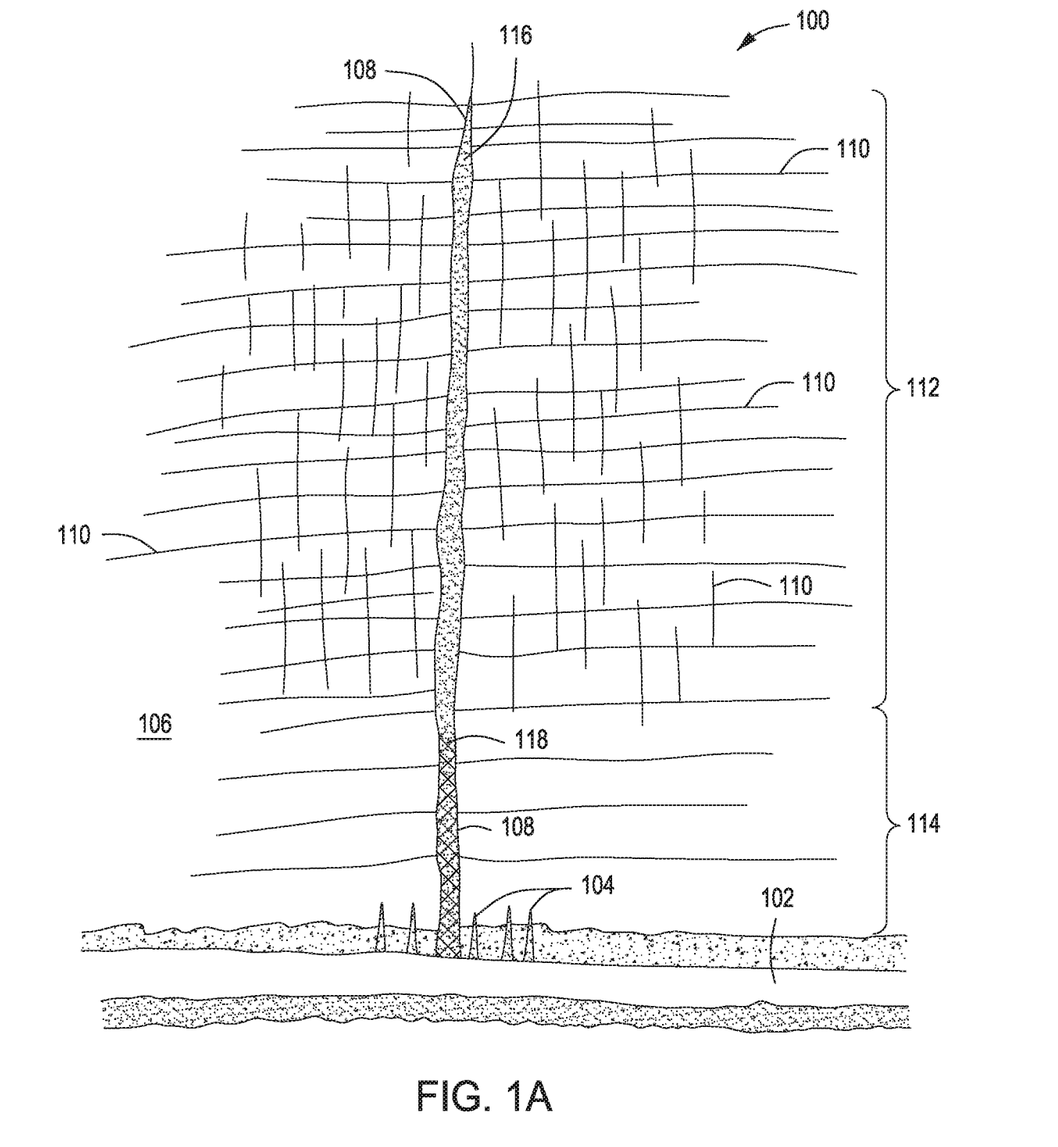
FIGS. 1A and 1B depict schematic cross-sectional images illustrating the ability of the present disclosure to create or enhance fracture complexity in both the far-field wellbore region and the near-wellbore region of a subterranean formation, according to one or more embodiments herein.
Figure 1B:
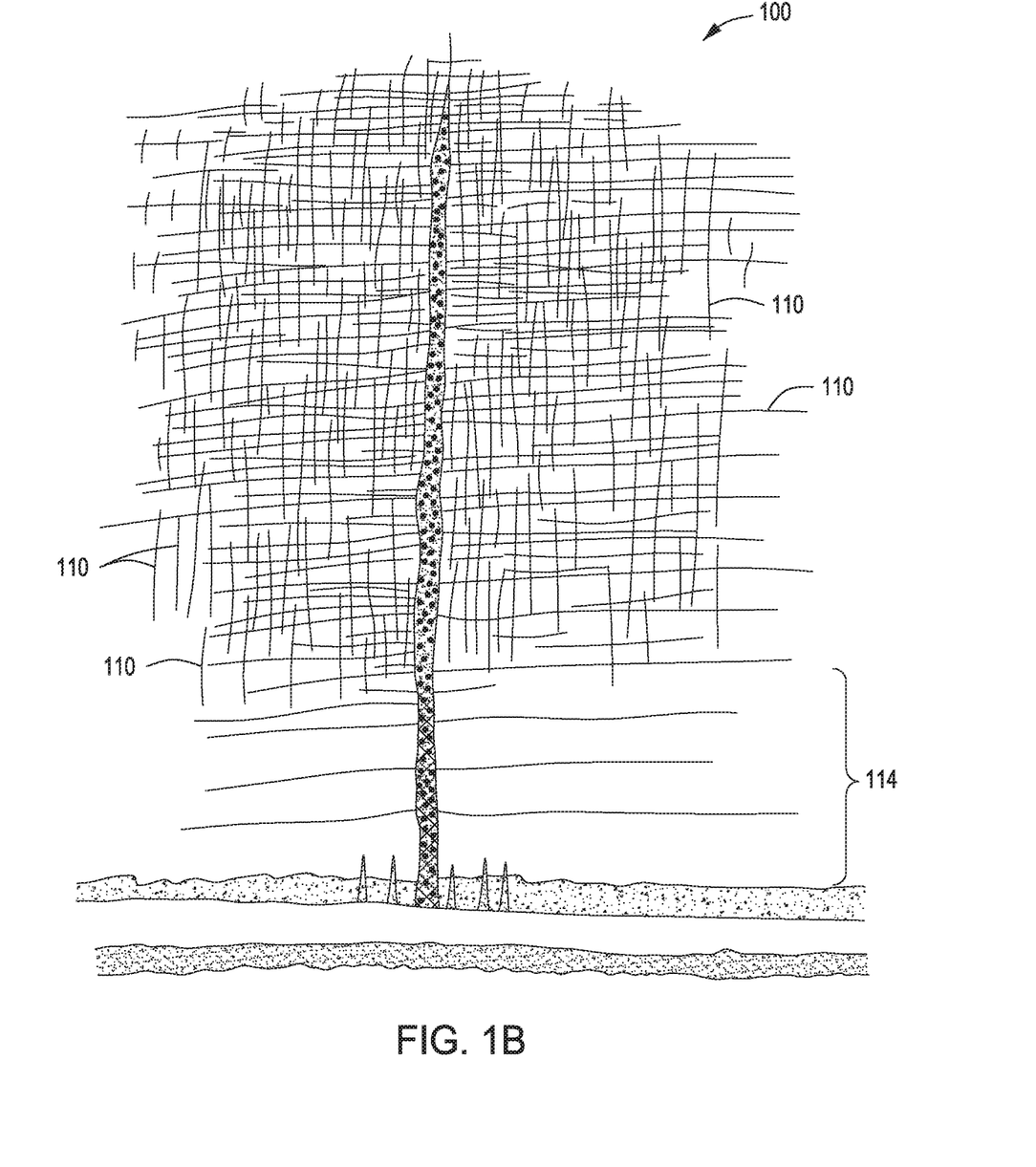

Referring now to FIGS. 1A and 1B, which depict schematic cross-sectional images illustrating the ability of the present disclosure to create or enhance fracture complexity in both the far-field wellbore region and the near-wellbore region of a subterranean formation, according to one or more embodiments herein. As shown in FIG. 1A, wellbore system 100 is an unconventional (or tight) formation treated with various treatment fluids of the present disclosure prior to detonation of the placed ECPs. Specifically, system 100 comprises wellbore 102 through which various openings in the form of perforations 104 have been formed for introducing the treatment fluids of the present disclosure into the formation 106. A dominate fracture 108 has been created and by introduction of the high-viscosity first treatment fluid described herein above the fracture gradient of the formation 106. Various branch fractures 110 have been created extending from the dominate fracture and extending from the other branch fractures by introduction of the low-viscosity secondary treatment fluid described herein above the fracture gradient, and comprising first ECPs and EMicroPs. The first ECPs may be liquid or solid (shown as liquid in FIG. 1A), which have been placed in the branch fractures 110, which may be initially generally perpendicular to the dominate fracture 108 and parallel with the natural bedding planes of the formation 106 (i.e., the bedding planes are themselves branch fractures), but may also be parallel to the dominate fracture 108, without departing from the scope of the present disclosure. The dominate fracture 108 is packed with second ECPs and first EMacroPs 116 (collectively) in the far-field wellbore region 112 of the formation 106 from introduction of the third treatment fluid described herein. Finally, the dominate fracture 108 is packed with second EMacroPs 118 in at least a portion of the near-wellbore region 114 of the formation 106 from introduction of the fourth treatment fluid described herein.

Referring now to FIG. 1B, illustrated is the same wellbore system 100 after detonation of the first and second ECPs, as described herein and with reference to FIG. 1A. As shown, after applying an electrical voltage to one or more of the first ECPs, the EMicroPs, the second ECPs, the first EMacroPs, the second EMacroPs, and any combination thereof, detonation of the first and/or second EPs occurs and fracture complexity is greatly enhanced. That is, the branch fractures 110 have greatly increased in number and, in some instances, length (and/or width), thereby increasing the surface area for produced hydrocarbons to flow. As shown, it is noteworthy that the portion of the near-wellbore region 114 may be protected from the detonation of the ECPs by placement of the ECPs farther from the wellbore (which may still comprise a portion of the near-wellbore region, as defined herein), thereby preserving the integrity of the formation at the perforation treatment interval.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated.

The pump may be a high pressure pump in some embodiments. As used herein, the term "high pressure pump" will refer to a pump that is capable of delivering a treatment fluid downhole at a pressure of 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of less than 1000 psi. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
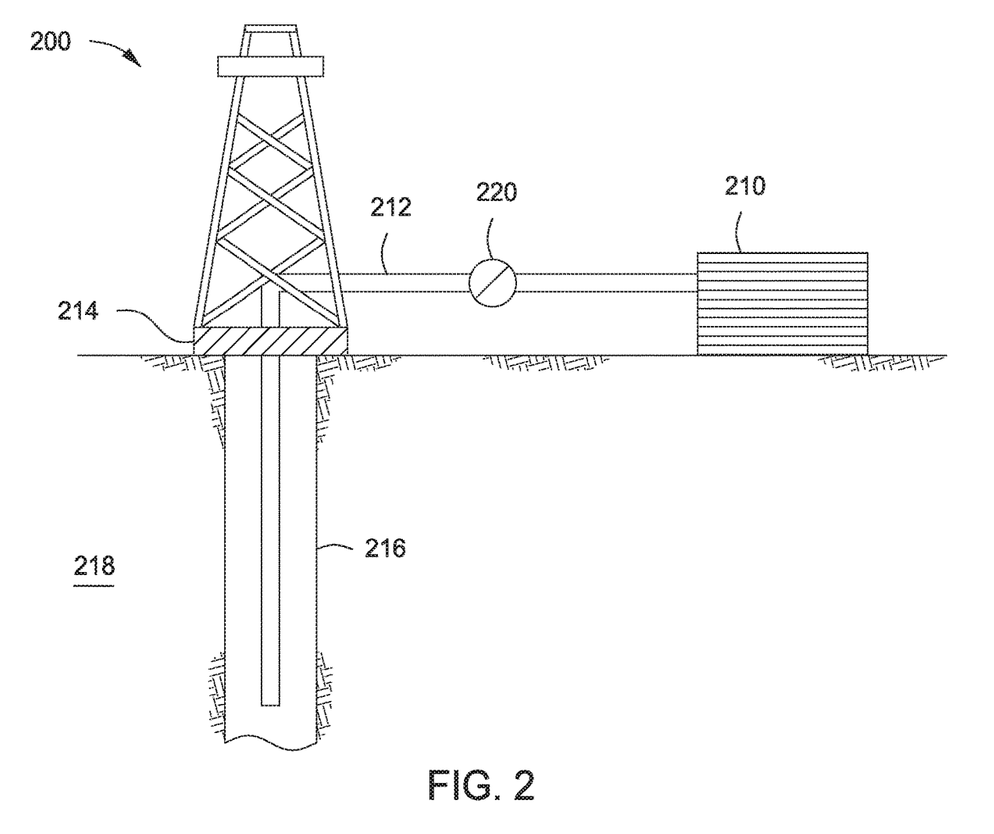
FIG. 2 depicts an embodiment of a system configured for delivering various treatment fluids of the embodiments described herein to a downhole location, according to one or more embodiments of the present disclosure.

FIG. 2 shows an illustrative schematic of a system that can deliver the treatment fluids (i.e., the first, second, third, fourth, and/or stabilizing treatment fluids) of the present disclosure to a downhole location, according to one or more embodiments. It should be noted that while FIG. 2 generally depicts a land-based system, it is to be recognized that like systems may be operated in subsea locations as well. As depicted in FIG. 2, system 200 may include mixing tank 210, in which the treatment fluids of the embodiments herein may be formulated. The treatment fluids may be conveyed via line 212 to wellhead 214, where the treatment fluids enter tubular 216, tubular 216 extending from wellhead 214 into subterranean formation 218. Upon being ejected from tubular 216, the treatment fluids may subsequently penetrate into subterranean formation 218. Pump 220 may be configured to raise the pressure of the treatment fluids to a desired degree before introduction into tubular 216. It is to be recognized that system 200 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid or a portion thereof may, in some embodiments, flow back to wellhead 214 and exit subterranean formation 218. In some embodiments, the treatment fluid that has flowed back to wellhead 214 may subsequently be recovered and recirculated to subterranean formation 218, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A method comprising: (a) introducing a first treatment fluid into a subterranean formation at a first treatment interval above a fracture gradient of the subterranean formation to create or enhance at least one dominate fracture therein, the first treatment fluid being solids-free and high-viscosity and comprising a first base fluid; (b) introducing a second treatment fluid into the subterranean formation above the fracture gradient of the subterranean formation to create or enhance at least one branch fracture therein, the second treatment fluid being low-viscosity and comprising a second base fluid, first electrically controlled propellants (first ECPs), and electroconductive micro-particulates (EMicroPs); (c) placing at least a portion of the first ECPs and the EMicroPs into the at least one branch fracture; (d) introducing a third treatment fluid into the subterranean formation above the fracture gradient, the third treatment fluid comprising a third base fluid, second electrically controlled propellants (second ECPs), and first electroconductive macro-particulates (first EMacroPs); (e) placing the second ECPs and the first EMacroPs into a far-field wellbore region of the dominate fracture; and (f) applying an electrical voltage to particulates selected from the group consisting of the first ECPs, the EMicroPs, the second ECPs, the first EMacroPs, and any combination thereof, thereby detonating propellants selected from the group consisting of the first ECPs, the second ECPs, and any combination thereof to enhance a complex fracture network comprising the at least one dominate fracture and the at least one branch fracture.

Embodiment A may have one or more of the following additional elements in any combination:

Element A1: Wherein the first ECPs are solid state, liquid state, or combinations of both solid state and liquid state; and wherein the second ECPs are solid state, liquid state, or combinations of both solid state and liquid state.

Element A2: Wherein the first ECPs are liquid state and the second ECPs are solid state.

Element A3: Wherein the electrical voltage is applied using an electrode extending into the subterranean formation from a source of electrical potential at a surface location and in current path contact with the first ECPs, the EMicroPs, the second ECPs, the first EMacroPs, and any combination thereof.

Element A4: Further comprising ceasing the electrical voltage in (f), and thereafter repeating (f) at least once at the first treatment interval.

Element A5: Further comprising repeating (a) through (f) at at least a second treatment interval.

Element A6: Further comprising repeating (a) through (f) at at least a second treatment interval; and further comprising ceasing the electrical voltage in (f), and thereafter repeating (f) at least once at the at least second treatment interval.

Element A7: Further comprising (g) introducing a stabilizing treatment fluid into the subterranean formation below the fracture gradient, the stabilizing treatment fluid being low-viscosity and comprising a fourth base fluid and a curable formation stabilizing agent.

Element A8: Further comprising (g) introducing a stabilizing treatment fluid into the subterranean formation below the fracture gradient, the stabilizing treatment fluid being low-viscosity and comprising a fourth base fluid and a curable formation stabilizing agent, and further comprising repeating (a) through (g) at at least a second treatment interval.

Element A9: Wherein the first treatment fluid comprises liquid electrically controlled propellants.

Element A10: Further comprising a pump fluidly coupled to a tubular extending into the subterranean formation, the tubular containing a treatment fluid selected from the group consisting of the first treatment fluid, the second treatment fluid, the third treatment fluid, and any combination thereof.

By way of non-limiting example, exemplary combinations applicable to A include: A1, A3, and A10; A2 and A7; A5, A6, and A9; A8 and A10; A1, A2, A5, A7, and A9; A3, A4, A7, A9, and A10; and any combination of one, more, or all of A1-A10, without limitation.

Embodiment B

A method comprising: (a) introducing a first treatment fluid into a subterranean formation at a first treatment interval above a fracture gradient of the subterranean formation to create or enhance at least one dominate fracture therein, the first treatment fluid being solids-free and high-viscosity and comprising a first base fluid; (b) introducing a second treatment fluid into the subterranean formation above the fracture gradient of the subterranean formation to create or enhance at least one branch fracture therein, the second treatment fluid being low-viscosity and comprising a second base fluid, first electrically controlled propellants (first ECPs), and electricoconductive micro-particulates (EMicroPs); (c) placing at least a portion of the first ECPs and the EMicroPs into the at least one branch fracture; (d) introducing a third treatment fluid into the subterranean formation above the fracture gradient, the third treatment fluid comprising a third base fluid, second electrically controlled propellants (second ECPs), and first electrically conductive macro-particulates (first EMacroPs); (e) placing the second ECPs and the first ECMacroPs into a far-field wellbore region of the dominate fracture; (f) introducing a fourth treatment fluid into the subterranean formation above the fracture gradient, the fourth treatment fluid comprising a fourth base fluid and second electrically conductive macro-particulates (second EMacroPs); (g) placing the second EMacroPs into a near-wellbore region of the dominate fracture; and (h) applying an electrical voltage to particulates selected from the group consisting of the first ECPs, the EMicroPs, the second ECPs, the first EMacroPs, the second EMacroPs, and any combination thereof, thereby detonating propellants selected from the group consisting of the first ECPs, the second ECPs, and any combination thereof to enhance a complex fracture network comprising the at least one dominate fracture and the at least one branch fracture.

Embodiment B may have one or more of the following additional elements in any combination:

Element B1: Wherein the first ECPs are solid state, liquid state, or combinations of both solid state and liquid state; and wherein the second ECPs are solid state, liquid state, or combinations of both solid state and liquid state.

Element B2: Wherein the first ECPs are liquid state and the second ECPs are solid state.

Element B3: Wherein the electrical voltage is applied using an electrode extending into the subterranean formation from a source of electrical potential at a surface location and in current path contact with the first ECPs, the EMicroPs, the second ECPs, the first EMacroPs, the second EMacroPs, and any combination thereof.

Element B4: Further comprising ceasing the electrical voltage in (f), and thereafter repeating (h) at least once at the first treatment interval.

Element B5: Further comprising repeating (a) through (h) at at least a second treatment interval.

Element B6: Further comprising repeating (a) through (h) at at least a second treatment interval; and further comprising ceasing the electrical voltage in (f), and thereafter repeating (h) at least once at the at least second treatment interval.

Element B7: Further comprising (i) introducing a stabilizing treatment fluid into the subterranean formation below the fracture gradient, the stabilizing treatment fluid being low-viscosity and comprising a fifth base fluid and a curable formation stabilizing agent.

Element B8: Further comprising (i) introducing a stabilizing treatment fluid into the subterranean formation below the fracture gradient, the stabilizing treatment fluid being low-viscosity and comprising a fifth base fluid and a curable formation stabilizing agent, and further comprising repeating (a) through (i) at at least a second treatment interval.

Element B9: Wherein the first treatment fluid comprises liquid electrically controlled propellants.

Element B10: Further comprising a pump fluidly coupled to a tubular extending into the subterranean formation, the tubular containing a treatment fluid selected from the group consisting of the first treatment fluid, the second treatment fluid, the third treatment fluid, the fourth treatment fluid, and any combination thereof.

By way of non-limiting example, exemplary combinations applicable to B include:

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   (a) introducing a first treatment fluid into a subterranean formation at a first treatment interval above a fracture gradient of the subterranean formation to create or enhance at least one dominate fracture therein, the first treatment fluid being solids-free and high-viscosity and comprising a first base fluid;
   (b) introducing a second treatment fluid into the subterranean formation above the fracture gradient of the subterranean formation to create or enhance at least one branch fracture therein, the second treatment fluid being low-viscosity and comprising a second base fluid, first electrically controlled propellants (first ECPs), and electroconductive micro-particulates (EMicroPs);
   (c) placing at least a portion of the first ECPs and the EMicroPs into the at least one branch fracture;
   (d) introducing a third treatment fluid into the subterranean formation above the fracture gradient, the third treatment fluid comprising a third base fluid, second electrically controlled propellants (second ECPs), and first electroconductive macro-particulates (first EMacroPs);
   (e) placing the second ECPs and the first EMacroPs into a far-field wellbore region of the dominate fracture; and
   (f) applying an electrical voltage to particulates selected from the group consisting of the first ECPs, the EMicroPs, the second ECPs, the first EMacroPs, and any combination thereof, thereby detonating propellants selected from the group consisting of the first ECPs, the second ECPs, and any combination thereof to enhance a complex fracture network comprising the at least one dominate fracture and the at least one branch fracture.

2. The method of claim 1, wherein the first ECPs are solid state, liquid state, or combinations of both solid state and liquid state; and
   wherein the second ECPs are solid state, liquid state, or combinations of both solid state and liquid state.

3. The method of claim 1, wherein the first ECPs are liquid state and the second ECPs are solid state.

4. The method of claim 1, wherein the electrical voltage is applied using an electrode extending into the subterranean formation from a source of electrical potential at a surface location and in current path contact with the first ECPs, the EMicroPs, the second ECPs, the first EMacroPs, and any combination thereof.

5. The method of claim 1, further comprising ceasing the electrical voltage in (f), and thereafter repeating (f) at least once at the first treatment interval.

6. The method of claim 1, further comprising repeating (a) through (f) at at least a second treatment interval.

7. The method of claim 1, further comprising repeating (a) through (f) at at least a second treatment interval; and further comprising ceasing the electrical voltage in (f), and thereafter repeating (f) at least once at the at least second treatment interval.

8. The method of claim 1, further comprising (g) introducing a stabilizing treatment fluid into the subterranean formation below the fracture gradient, the stabilizing treatment fluid being low-viscosity and comprising a fourth base fluid and a curable formation stabilizing agent.

9. The method of claim 1, further comprising (g) introducing a stabilizing treatment fluid into the subterranean formation below the fracture gradient, the stabilizing treatment fluid being low-viscosity and comprising a fourth base fluid and a curable formation stabilizing agent, and further comprising repeating (a) through (g) at at least a second treatment interval.

10. The method of claim 1, wherein the first treatment fluid comprises liquid electrically controlled propellants.

11. The method of claim 1, further comprising a pump fluidly coupled to a tubular extending into the subterranean formation, the tubular containing a treatment fluid selected from the group consisting of the first treatment fluid, the second treatment fluid, the third treatment fluid, and any combination thereof.

12. A method comprising:
(a) introducing a first treatment fluid into a subterranean formation at a first treatment interval above a fracture gradient of the subterranean formation to create or enhance at least one dominate fracture therein, the first treatment fluid being solids-free and high-viscosity and comprising a first base fluid;
(b) introducing a second treatment fluid into the subterranean formation above the fracture gradient of the subterranean formation to create or enhance at least one branch fracture therein, the second treatment fluid being low-viscosity and comprising a second base fluid, first electrically controlled propellants (first ECPs), and electricoconductive micro-particulates (EMicroPs);
(c) placing at least a portion of the first ECPs and the EMicroPs into the at least one branch fracture;
(d) introducing a third treatment fluid into the subterranean formation above the fracture gradient, the third treatment fluid comprising a third base fluid, second electrically controlled propellants (second ECPs), and first electrically conductive macro-particulates (first EMacroPs);
(e) placing the second ECPs and the first ECMacroPs into a far-field wellbore region of the dominate fracture;
(f) introducing a fourth treatment fluid into the subterranean formation above the fracture gradient, the fourth treatment fluid comprising a fourth base fluid and second electrically conductive macro-particulates (second EMacroPs);
(g) placing the second EMacroPs into a near-wellbore region of the dominate fracture; and (h) applying an electrical voltage to particulates selected from the group consisting of the first ECPs, the EMicroPs, the second ECPs, the first EMacroPs, the second EMacroPs, and any combination thereof, thereby detonating propellants selected from the group consisting of the first ECPs, the second ECPs, and any combination thereof to enhance a complex fracture network comprising the at least one dominate fracture and the at least one branch fracture.

13. The method of claim 12, wherein the first ECPs are solid state, liquid state, or combinations of both solid state and liquid state; and
wherein the second ECPs are solid state, liquid state, or combinations of both solid state and liquid state.

14. The method of claim 12, wherein the first ECPs are liquid state and the second ECPs are solid state.

15. The method of claim 12, wherein the electrical voltage is applied using an electrode extending into the subterranean formation from a source of electrical potential at a surface location and in current path contact with the first ECPs, the EMicroPs, the second ECPs, the first EMacroPs, the second EMacroPs, and any combination thereof.

16. The method of claim 12, further comprising ceasing the electrical voltage in (f), and thereafter repeating (h) at least once at the first treatment interval.

17. The method of claim 12, further comprising repeating (a) through (h) at at least a second treatment interval.

18. The method of claim 12, further comprising repeating (a) through (h) at at least a second treatment interval; and further comprising ceasing the electrical voltage in (f), and thereafter repeating (h) at least once at the at least second treatment interval.

19. The method of claim 12, further comprising (i) introducing a stabilizing treatment fluid into the subterranean formation below the fracture gradient, the stabilizing treatment fluid being low-viscosity and comprising a fifth base fluid and a curable formation stabilizing agent.

20. The method of claim 12, further comprising (i) introducing a stabilizing treatment fluid into the subterranean formation below the fracture gradient, the stabilizing treatment fluid being low-viscosity and comprising a fifth base fluid and a curable formation stabilizing agent, and further comprising repeating (a) through (i) at at least a second treatment interval.

* * * * *